(12) United States Patent
Bikumala et al.

(10) Patent No.: US 11,488,108 B2
(45) Date of Patent: Nov. 1, 2022

(54) OPTIMIZING PEER TO PEER COLLABORATIVE SUPPORT

(71) Applicant: Dell Products L. P., Round Rock, TX (US)

(72) Inventors: Sathish Kumar Bikumala, Round Rock, TX (US); Neha Wadhwani, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 483 days.

(21) Appl. No.: 15/884,528

(22) Filed: Jan. 31, 2018

(65) Prior Publication Data

US 2019/0236546 A1    Aug. 1, 2019

(51) Int. Cl.
*G06Q 10/00*       (2012.01)
*G06Q 10/10*       (2012.01)
*G06F 16/903*      (2019.01)

(52) U.S. Cl.
CPC ......... *G06Q 10/101* (2013.01); *G06F 16/903* (2019.01)

(58) Field of Classification Search
CPC ............................. G06Q 10/101; G06F 16/903

USPC .......................................................... 705/30
See application file for complete search history.

(56) References Cited

U.S. PATENT DOCUMENTS

| | | | |
|---|---|---|---|
| 8,234,143 B1 * | 7/2012 | Brewer | G06Q 10/0631 705/7.17 |
| 2010/0030900 A1 * | 2/2010 | Manion | H04L 67/1057 709/227 |
| 2012/0331052 A1 * | 12/2012 | Rathod | G06F 16/275 709/204 |

* cited by examiner

*Primary Examiner* — Rokib Masud
(74) *Attorney, Agent, or Firm* — Krishnendu Gupta; Deepika Bhayana; Derek Lam (57) ABSTRACT

Disclosed herein are methods, systems, and processes to optimize peer to peer collaborative support in enterprise computing environments. A search request including a query directed to an organizational chart is received from a user computing device. The organizational chart includes knowledge profiles and peer to peer references associated with peer computing devices. A peer list including one or more peer computing devices is generated using a best-first search methodology and sent to the user computing device. One or more knowledge profiles and one or more peer references associated with one or more peer computing devices are updated.

20 Claims, 9 Drawing Sheets

OPTIMIZING PEER TO PEER COLLABORATIVE SUPPORT

FIELD OF THE DISCLOSURE

This disclosure is related to facilitating application support. In particular, this disclosure is related to optimizing peer to peer collaborative support.

DESCRIPTION OF THE RELATED ART

A peer-to-peer (P2P) service is a decentralized computing platform where two or more individuals or parties can interact directly with each other, without intermediation and involvement by a third-party or an enterprise selling a product or a service. The individuals or parties interact, communicate, and/or transact directly with each other via the P2P service. Therefore, P2P can be useful for bringing people together to work on joint projects, share information, and/or communicate without intermediation.

Modern technology enterprises implement a ticketing system that permits users to seek expert assistance regarding various technical issues (e.g., hardware malfunction, technical support for devices, assistance with software installation, and the like). A ticketing system permits information technology (IT) support to be organized, focused, efficient, and effective, and directly impacts a company's costs and revenues, customer retention, and brand image. Such ticketing systems (or issue tracking systems) typically include information for the account involved and issue encountered, and include a knowledge base containing information on the customer, resolutions to common problems, and other such data.

Providing expert customer support, particularly for technical issues, is expensive from a financial perspective because of the cost of hiring and training competent technical support professionals. The cost-benefit calculus of providing such expert support is further reduced if a significant amount of support tickets involve low impact and/or repetitive issues. Unfortunately, modern technical support ticketing and issue tracking computing systems are not optimized to adopt and take advantage of the large-scale enterprise adoption of collaborative P2P services.

SUMMARY OF THE DISCLOSURE

Disclosed herein are methods, systems, and processes to optimize peer to peer application support. One such method involves receiving a search request from a user computing device, where the search request includes a query directed to an organizational chart and the organizational chart includes knowledge profiles and peer to peer references associated with peer computing devices, generating a peer list include one or more peer computing devices using a best-first search methodology, sending the peer list to the user computing device, and updating one or more knowledge profiles and one or more peer references associated with at least one peer computing device of one or more peer computing devices. In certain embodiments, each knowledge profile is based on matter knowledge, availability, geo-location, or engagement level of each peer computing device. In this example, the method compares the peer rating values with the peer references associated with at least one of the one or more peer computing devices, and based on the comparing, determines a level of false positive machine-skewing for each of the one or more peer references. As part of the updating, the method refreshes each of the one or more peer references based on the level of false positive machine-skewing.

In some embodiments, the method involves generating the knowledge profiles by performing a schema extension operation including the organizational chart, determining whether the peer list can be generated, and if the peer list can be generated, inhibiting sending of the search request received from the user computing device to a support computing device. In other embodiments, the method involves receiving another search request including the query from another user computing device and generating another peer list from the updated organizational chart. In this example, the query is associated with one or more operating characteristics of an application, and the application is executed by the user computing device and each of the peer computing devices.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

In an enterprise operational computing environment, it is challenging to measure a given person's expertise and/or proficiency level with respect to any given application and/or product that requires expert technical support. Without this vital information, a support ticket can end up being redundantly transferred from one support team to another—costing the enterprise time and financial resources.

A customer-helps-customer philosophy (e.g., in the form of crowd service) enables enterprises to be more efficient and improve their service without losing sight of the benefits of human interaction. Crowd service results in better service provision at a lower cost while still maintaining the advantages of personal human interaction. For example, when a consumer submits a query about a product category, it is often cost and time prohibitive for enterprises to answer those queries personally. When the input on non-core queries comes from other consumers, the cost and time calculus is limited. Therefore, enabling P2P collaboration in a corporate business environment minimizes or even prevents the need to handle support tickets by more expensive technical support teams and professionals.

As previously noted, a significant number of support tickets in modern operational environments are low impact and repetitive in nature. Personally adhering to such service requests and support tickets is cost and time prohibitive, particularly if such requests and tickets can be handled by one or more peers in a cost and time effective manner Avoiding, or at least minimizing, low impact and non-core technical support tickets substantially reduces the cost of information technology (IT) services, while at the same time establishing and facilitating meaningful and useful human to human interactions. Unfortunately, modern technical support ticketing and issue tracking computing systems are not optimized to adopt and take advantage of the large-scale enterprise adoption of collaborative P2P services.

Disclosed herein are methods, systems, and processes to optimize peer to peer collaborative support.

Example Peer to Peer Support Computing System

Figure 1:
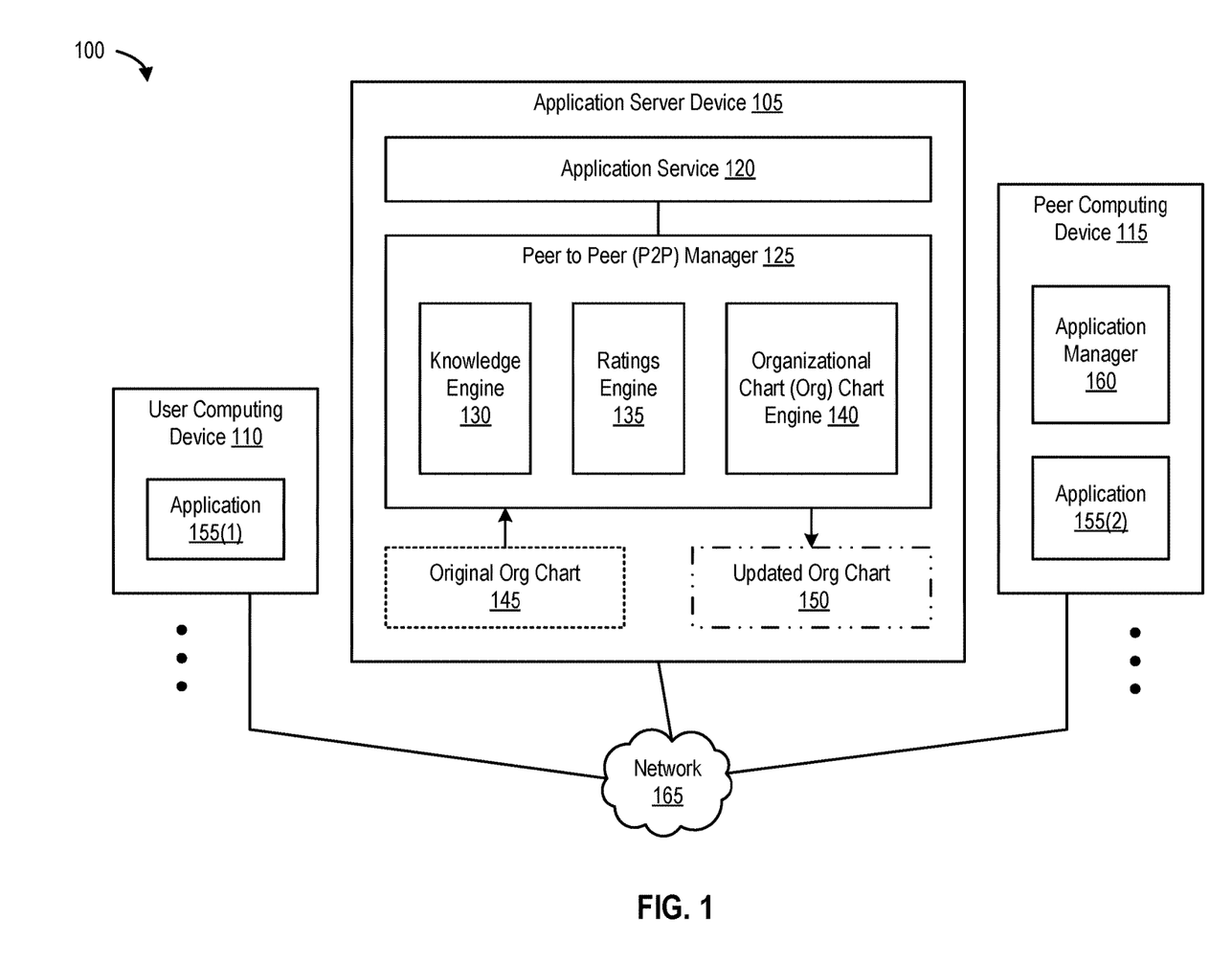
FIG. 1 is a block diagram 100 peer to peer (P2P) support computing system, according to one embodiment of the present disclosure.

FIG. 1 is a block diagram 100 of a peer to peer (P2P) support computing system, according to one embodiment. The P2P support computing system as shown in FIG. 1 includes at least an application server device 105, one or more user computing devices such as user computing device 110, and one or more peer computing devices such as peer computing device 115. Application server device 105, user computing device 110, and peer computing device 115 are communicatively coupled via network 165, and can each be any type of computing device including but not limited to a desktop, a laptop, a server, a tablet, a mobile computing device, and the like. Network 165 can be any type of network or interconnection (e.g., the Internet, a Wide Area Network (WAN), and the like).

User computing device 110 implements an application 155(1) and peer computing device 115 implements an application 155(2) as well as an application manager 160. Applications 155(1) and 155(2) can be any type of application, computer program, and/or software product. Application manager 160 manages one or more applications executed by peer computing device 115. For example, application manager 160 can maintain information regarding at least the number of applications executing on peer computing device 115, the type of applications executing on peer computing device 115 (e.g., word processors, imaging software, financial software, and the like), the amount of time each application is used by a given user of peer computing device 115, and one or more features of each application executing on peer computing device 115 that are used by a given user of peer computing device 115 (e.g., mail merging in a word processor, stock trading functions in financial software, video editing functions in imaging software, and the like). Therefore, application manager 160 maintains information associated with how (e.g., feature access information, task proficiency information, and the like) and when (e.g., duration information, time and date information, idle or active information, and the like) one or more applications (and application features) executing on peer computing device 115 are used by a user of peer computing device 115. In this example, application 155(1) executing on user computing device 110 is the same as or substantially similar to application 155(2) executing on peer computing device 115 (e.g., the same (or similar type of) financial software applications of the same version or different versions).

Application server device 105 implements at least an application service 120 and a peer to peer (P2P) manager 125, and includes an original organizational chart 145 and an updated organization chart 150. Application service 120 manages one or more applications executing on user computing devices and peer computing devices. For example, application service 120 maintains user information regarding the users of certain applications executing on user computing devices and peer computing devices. Application service 120 also monitors the application ecosystem of the P2P computing system of FIG. 1 including, but not limited to, end users, applications, underlying infrastructure components such as application server device 105, databases, big data stores, middleware, messaging components, web servers, virtual systems, and cloud resources.

Original organizational chart 145 and updated organizational chart 150 are both organizational charts generated and managed by P2P manager 125 and include information describing and detailing the internal structure of an enterprise, a corporation, a business, a company, or any other type of organization. For example, in a corporate business enterprise, original organization chart 145 includes employee names and their positions represented by boxes (or other shapes) and can include photos, contact information, location, department information, and the like. Straight or elbowed lines can link the levels of various employees together creating a clear visual depiction of the corporate hierarchy and ranks of different employees, jobs, and departments that make up the organization. Updated organization chart 150 is created from original organization chart 145 by P2P manager 125 and includes information to optimize P2P collaborative support generated by P2P manager 125 and not originally present in original organizational chart 145.

P2P manager 125 implements at least a knowledge engine 130, a ratings engine 135, and an organizational chart (org) chart engine 140. Knowledge engine 130 generates knowledge profiles for entities (e.g., employees or users) identified by P2P manager 125 in original organizational chart 145. Ratings engine 135 designates peer ratings assigned to one or more peers (e.g., users of peer computing devices) by users of user computing devices. Organizational chart engine 140 refreshes, updates, and reorganizes original organization chart 145 into updated organization chart 150 based on the knowledge profiles and the peer ratings.

Example of Facilitating Collaborative Application Support

Figure 2A:
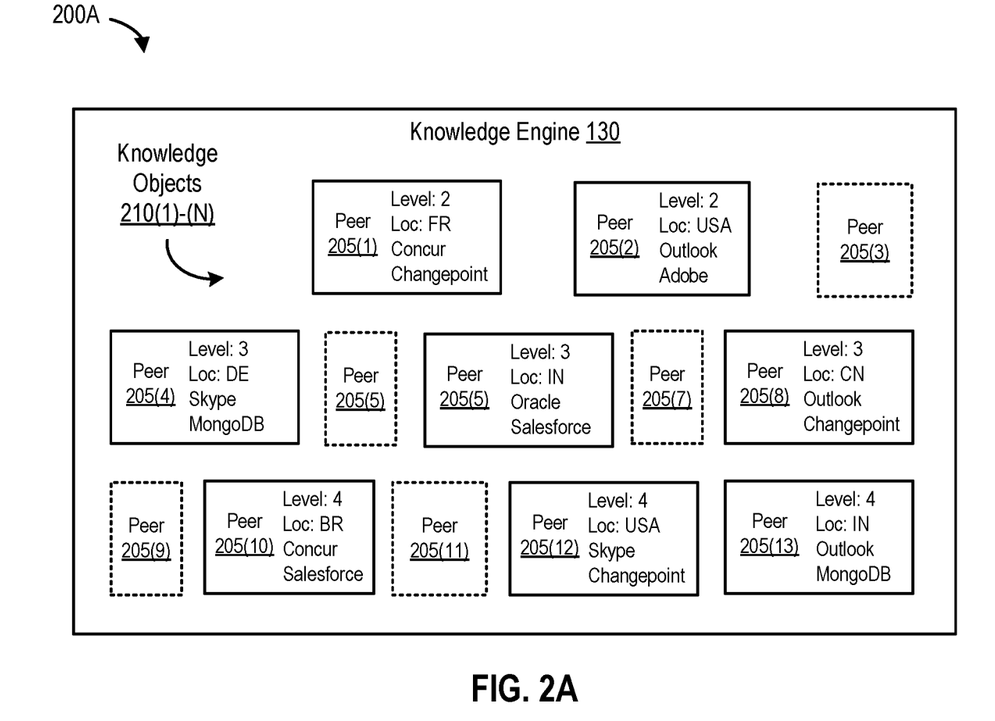
FIG. 2A is a block diagram 200A of a knowledge engine, according to one embodiment of the present disclosure.

FIG. 2A is a block diagram 200A of a knowledge engine, according to one embodiment. Knowledge engine 130 includes knowledge objects 210(1)-(N). In this example, knowledge objects 210(1)-(N) are peers associated with peer computing devices. In one embodiment, organization chart engine 140 creates (or builds) original organization chart 145 (e.g., based on available and/or active peer computing devices and their associated users) and knowledge engine 130 generates knowledge profiles for one or more peers included in original organization chart 145. Such knowledge profiles can include the level of the peer, the location of the peer, application(s) expertise of the peer (e.g., based on information collected by an application manager such as application manager 160 executing on peer computing devices such as peer computing device 115), and the like.

P2P manager 125 then uses a search methodology (e.g., a Best First Search (BFS) methodology, among others) for traversing or searching a tree or graph data structure such as original organization chart 145 to search for one or more peers (e.g., in response a query from a user of user computing device 110). In this manner, original organization chart 145 can be initially searched for one or more peers for preliminary query handling based on requirement driven conditions (e.g., level, location, application expertise, and the like).

Figure 2B:
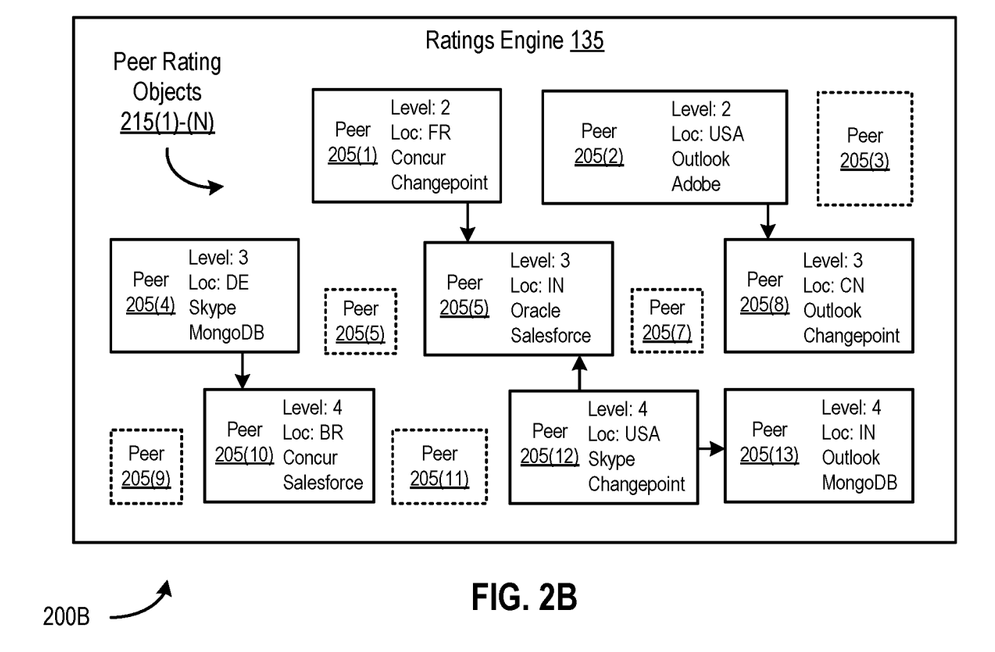
FIG. 2B is a block diagram 200B of a ratings engine, according to one embodiment of the present disclosure.

FIG. 2B is a block diagram 200B of a ratings engine, according to one embodiment. Ratings engine 135 captures and refreshes knowledge information (e.g., application expertise for a given peer), availability information (e.g., whether a given peer computing device is active or idle), geo-location information (e.g., the geographic location of a peer, time-zone information, and the like), and engagement level information (e.g., how often a given peer interacts with an application and particular features of that application, as well as how frequently (or infrequently) the peer offers support to users) of the peers identified by organization chart engine 140 in original organization chart 145. Ratings engine 135 also implements a P2P rating systems to compensate for machine-skewing in the search methodology implemented by P2P manager 125 (e.g., to eliminate or minimize false positive results).

In one embodiment, application server device 105 receives a search request from user computing device 110. In this example, the search request includes a query directed to original organizational chart 145 (e.g., the user of user computing device 110 looks up original organization chart 145 on the Intranet), and original organizational chart 145 includes knowledge profiles and peer to peer references associated with peer computing devices (e.g., peer computing device 115). P2P manager 125 generates a peer list that includes one or more peer computing devices using a BFS methodology and sends the peer list to user computing device 110. Next, knowledge engine 130 updates one or more knowledge profiles and ratings engine 135 updates one or more peer references (e.g., peer ratings) associated with one or more peer computing devices that are chosen to be included in the peer list by P2P manager 125. Finally, organization chart engine 140 refreshes and reorganizes original organization chart 145 into updated organization chart 150 based on the knowledge profile and peer reference updates generated by knowledge engine 130 and ratings engine 135.

In certain embodiments, a given knowledge profile generated by knowledge engine 130 is based on matter knowledge (e.g., application(s) expertise level), geo-location, or engagement level of a given peer computing device. For example, ratings engine 135 compares peer rating values with the peer references associated with one or more peer computing devices chose by P2P manager 125 to be part of the peer list, and based on the comparing, determines a level of false positive machine-skewing for the peer references. As part of updating original organization chart 145, ratings engine 135 refreshes the peer references based on the level of false positive machine-skewing. For example, if a peer computing device is chosen to be included in the peer list by P2P manager 125 based on an application expertise of a user of the given peer computing device, ratings engine 135 can lower the peer reference of the user of the given peer computing device if that user receives a low peer rating value from a user of a user computing device after the support experience is complete (e.g., after the user opens a dialogue, receives assistance regarding their query, and rates the support experience). In this manner, ratings engine 135 prevents organization chart engine 140 from updating original organization chart 145 for a given peer solely based on the peer's knowledge profile. Instead, organization chart engine 140 refreshes and reorganizes original organization chart 145 into updated organization chart 150 after receiving real time user feedback that corrects machine-skewing.

A schema is a definition of attributes and classes that are part of a distributed directory and is similar to fields and tables in a database. Original organizational chart 145 is one example of such a distributed directory. Schemas include a set of rules which determine the type and format of data that can be added or included in the database. For example, the User class (e.g., a peer in original organizational chart 145) is one example of a class that is stored in the database, and examples of User class attributes can include the user's first name, last name, location, level, application expertise, peer ratings, and so on. The process of adding definitions to the schema is referred to as extending the schema which can be performed by a schema extension operation.

In some embodiments, knowledge engine 130 generates and updates knowledge profiles by performing a schema extension operation including original organization chart 145. P2P manager 125 then determines whether a peer list can be generated (e.g., whether there are one or more peers with the necessary attributes requested by or required to answer a given user's query in a search request). If the peer list can be generated, P2P manager 125 inhibits sending of the search request received from user computing device 110 to a support computing device.

In other embodiments, P2P manager 125 receives another search request including the (same) query from another user computing device and generates another peer list from updated organizational chart 150. In this example, the query is associated with one or more operating characteristics of an application (e.g., setup, shutdown, troubleshooting, features, functions, and the like, associated with the application).

Example of Refreshing and Reorganizing an Organizational Chart

Figure 3:
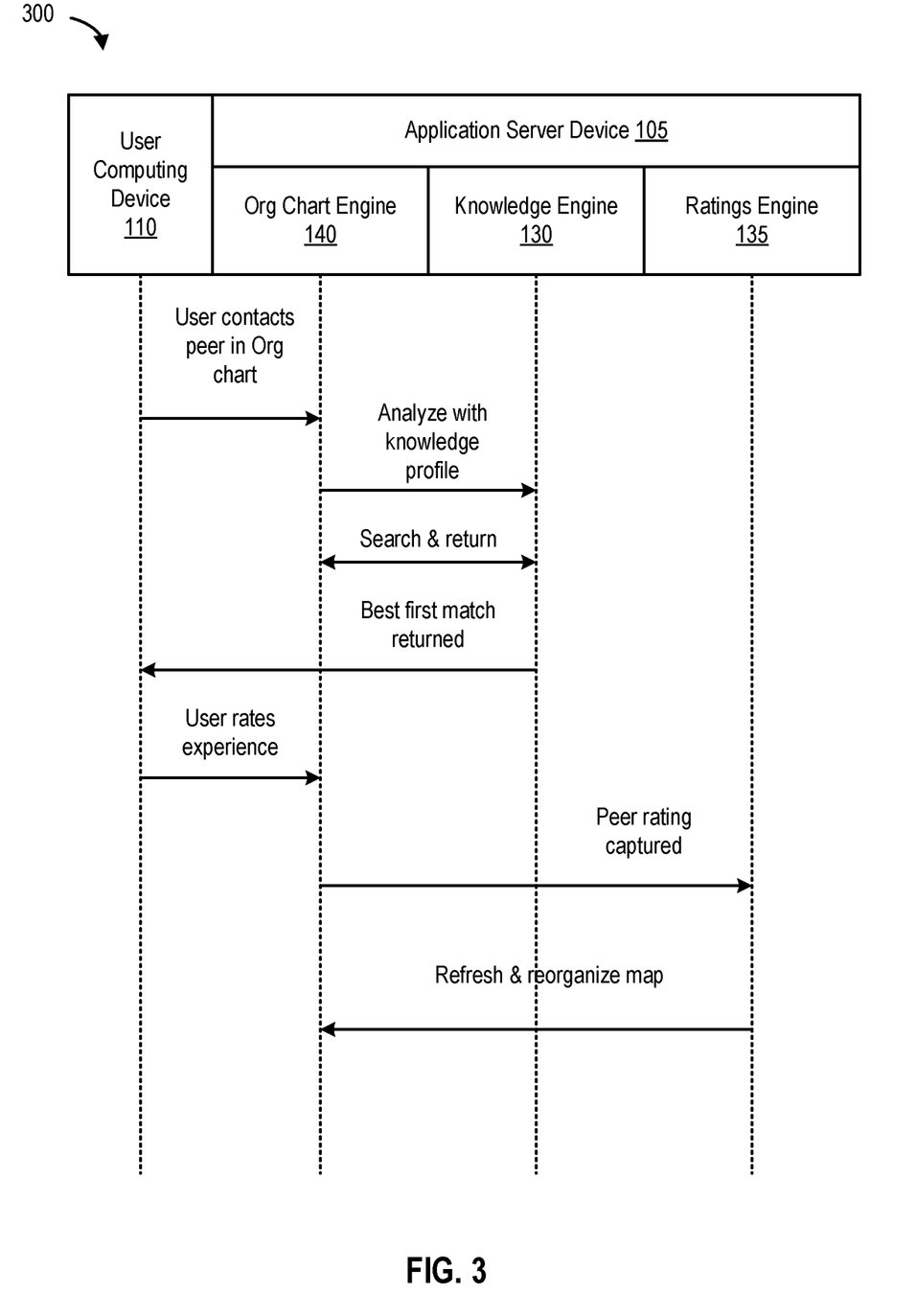
FIG. 3 is a table 300 of refreshing and reorganizing an organizational chart, according to one embodiment of the present disclosure.

FIG. 3 is a table 300 of refreshing and reorganizing an organizational chart, according to one embodiment. A user of user computing device 110 contacts a peer in original organization chart 145 generated by organization chart engine 145. Knowledge engine 130 analyzes the search issued by the user based on knowledge profiles generated by knowledge engine 130 for peers in original organizational chart 145 and searches original organizational chart 145 for peer to be included in a peer list. Knowledge engine 130 then generates the peer list using a BFS methodology and sends the peer list to user computing device 110.

The user of user computing device 110 opens a dialogue and receives assistance (e.g., from one or more peers in the peer list generated by P2P manager 125). The user then rates the (support) experience which is received and captured by ratings engine 135. Ratings engine 135, in conjunction with organization chart engine 140 refreshes and reorganizes original organizational chart 145 into updated organizational chart 150 based on the peer rating value(s) supplied by the user after the support experience (upon which original organizational chart 145 can be deleted from application server device 105 by P2P manager 125).

Example Processes to Optimize Peer to Peer Collaborative Support

Figure 4:
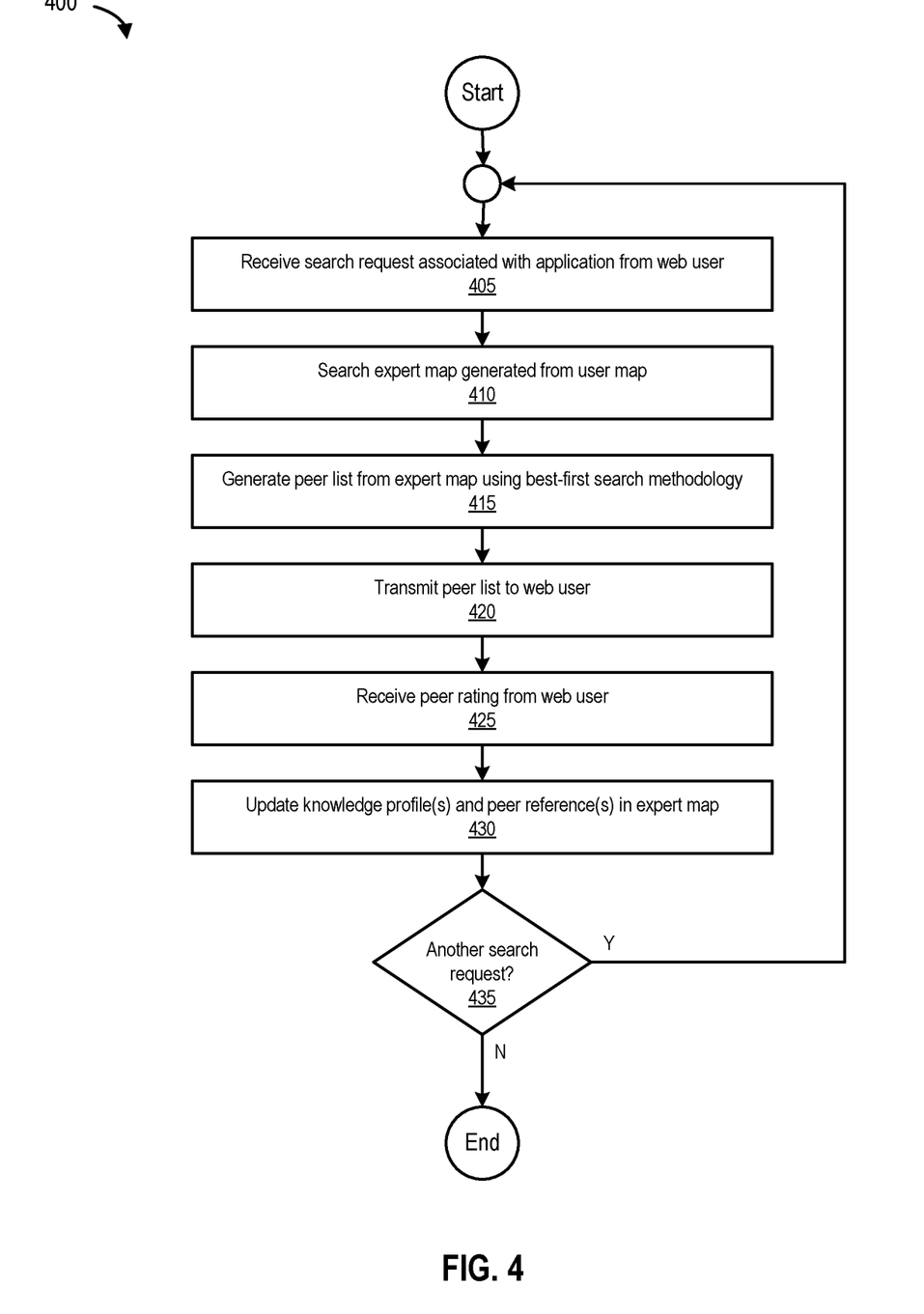
FIG. 4 if a flowchart 400 of a process for updating knowledge profiles and peer references, according to one embodiment of the present disclosure.

FIG. 4 if a flowchart 400 of a process for updating knowledge profiles and peer references, according to one embodiment. The process begins at 405 by receiving a search request associated with an application (e.g., application 155(1)) from a web user (e.g., a user of user computing device 110). At 410, the process searches an expert map generated from a user map (e.g., original organizational chart 145). For example, a user map of available and active peers can be provided to or accessed by P2P manager 125 and P2P manager 125 can then generate the expert map based on knowledge profiles of the peers (e.g., by performing a schema extension operation as previously noted).

At 415, the process generates a peer list from the expert map using a best-first search methodology, and at 420, transmits the peer list to the web user. At 425, the process receives a peer rating from the web user, and at 430, updates knowledge profile(s) and peer reference(s) in the expert map (e.g., the updating generates updated organizational chart 150). At 435, the process determines if there is another search request. If there is another search request, the process loops to 405. Otherwise, the process ends.

Figure 5:
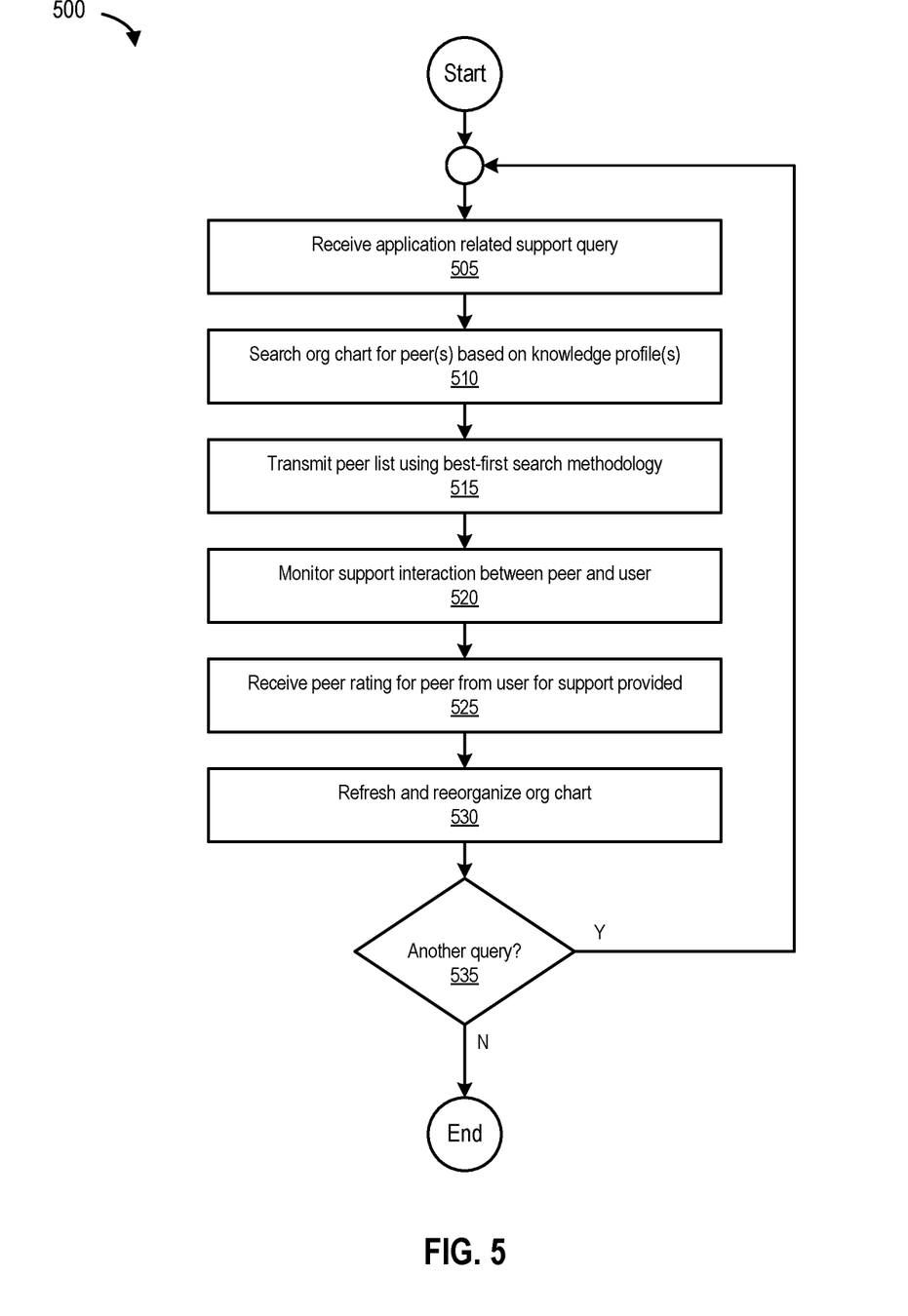
FIG. 5 is a flowchart 500 of a process for refreshing and reorganizing an organizational chart, according to one embodiment of the present disclosure.

FIG. 5 is a flowchart 500 of a process for refreshing and reorganizing an organizational chart, according to one embodiment. The process begins at 505 by receiving an application related support query. At 510, the process searches an organizational chart for peer(s) based on knowledge profile(s) (e.g., original organizational chart 145 or an expert map generated from a user map by knowledge engine 130 or organizational chart engine 140).

At 515, the process transmits a peer list using a best-first search methodology. The best-first search methodology explores a graph or a map (e.g., original organizational chart 145) by expanding the most promising node chosen according to a specified rule (e.g., based on knowledge profile(s) of peer(s)). At 520, the process monitors the support interaction between a given peer and a user (e.g., between user computing device 110 and peer computing device 115). At 525, the process receives a peer rating for the given peer from the user for the support received (e.g., to account for machine-skewing based on merely knowledge profile(s)), and at 530, refreshes and reorganizes original organizational chart 145 (e.g., into updated organizational chart 150). At 535, the process determines if there is another query. If there is another query, the process loops to 505. Otherwise, the process ends.

Figure 6:
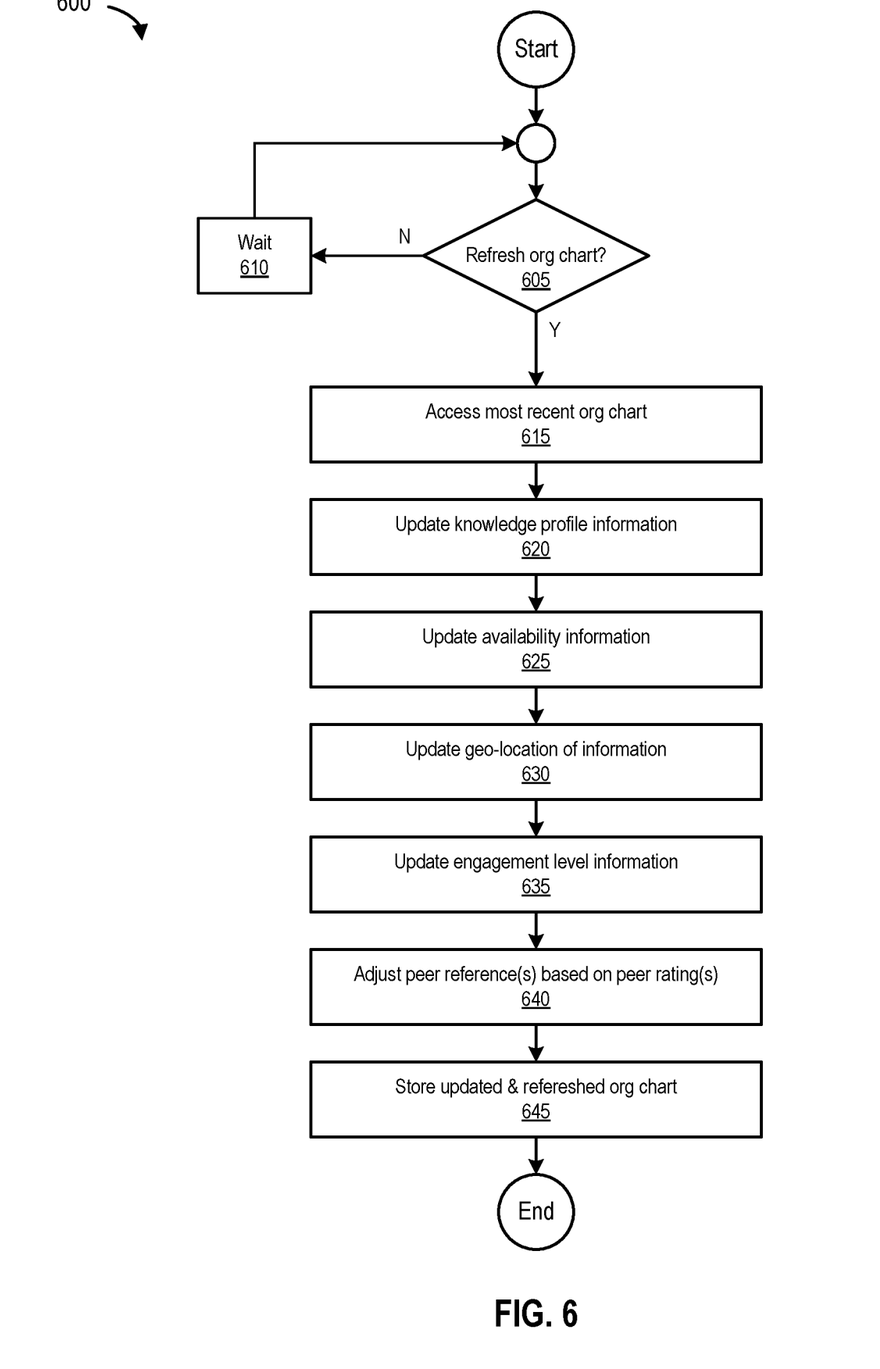
FIG. 6 is a flowchart 600 of a process for storing an updated organizational chart, according to one embodiment of the present disclosure.

FIG. 6 is a flowchart 600 of a process for storing an updated organizational chart, according to one embodiment. The process begins at 605 by determining if an organizational chart has to be refreshed. If the organizational chart does not have to be refreshed (e.g., no peer rating has been received or no support has been provided), the process, at 610, waits and loops back to 605. However, if the organizational chart has to be refreshed, the process, at 615, accesses the most recent organizational chart (e.g., updated organizational chart 150 if updated organizational chart 150 is the most recent organizational chart; if updated organizational chart 150 has not (yet) been created, original organizational chart 145 can be considered the most recent organizational chart).

At 620, the process updates knowledge profile information (e.g., whether a peer has gained expertise in a new application or expertise associated with one or more new features of an existing application), at 625, the process updates availability information (e.g., whether or not a peer is available to offer support), at 630, the process updates geo-location information (e.g., whether a peer has changed locations or time zones), and at 635, the process updates engagement level information (e.g., whether a peer is increasing or decreasing his engagement with a particular user or with respect to a particular application or application feature). At 640, the process adjusts peer reference(s) based on peer rating(s), and ends at 645 by storing the updated and refreshed organizational chart (e.g., in a volatile or non-volatile storage device associated with application server device 105).

Figure 7:
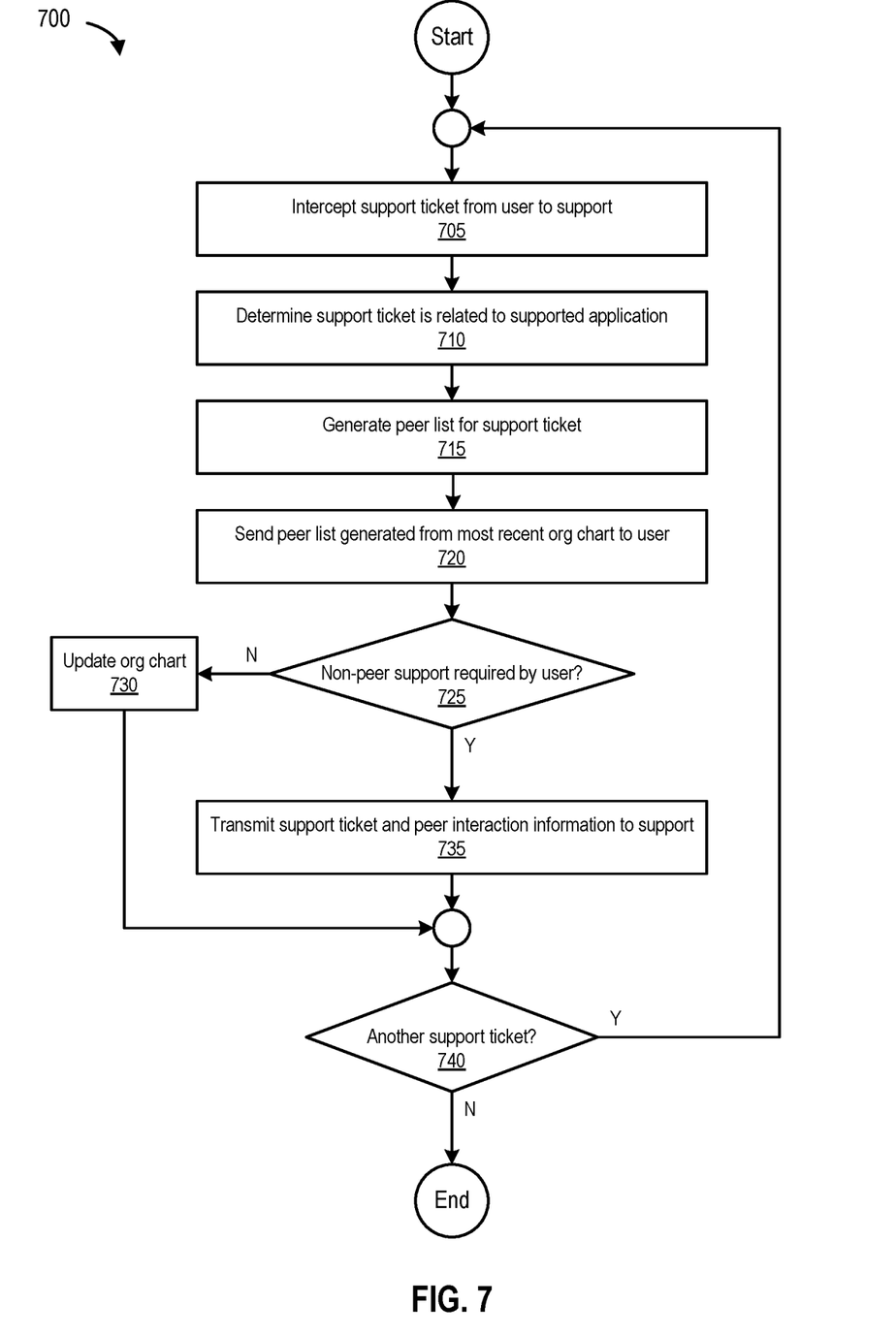
FIG. 7 is a flowchart 700 of a process for handling support tickets, according to one embodiment of the present disclosure.

FIG. 7 is a flowchart 700 of a process for handling support tickets, according to one embodiment. The process begins at 705 by intercepting a support ticket from a user (e.g., of user computing device 110) to support (e.g., to a support computing device such as a support server associated with one or more technical support professionals). At 710, the process determines that the support ticket is related to a supported application (e.g., an application that can be serviced by peers). At 715, the process generates a peer list for the support ticket (e.g., by searching a map of experts generated from an existing user map), and at 720, sends the peer list generated from the most recent organizational chart (e.g., map of experts) to the user.

At 725, the process determines if non-peer support is required by the user. If non-peer support is not required by the user, the process, at 730, updates the organizational chart (e.g., based on received user ratings), and loops to 740. However, if non-peer support is required by the user, the process, at 735, transmits the support ticket and peer interaction information (which can be useful and time-saving information for the support professional) to the support. At 740, the process determines if there is another support ticket. If there is another support ticket, the process loops to 705. Otherwise, the process ends.

It will be appreciated that the methods, systems, and processes disclosed herein optimize peer to peer collaborative support.

Example Computing Environment

Figure 8:
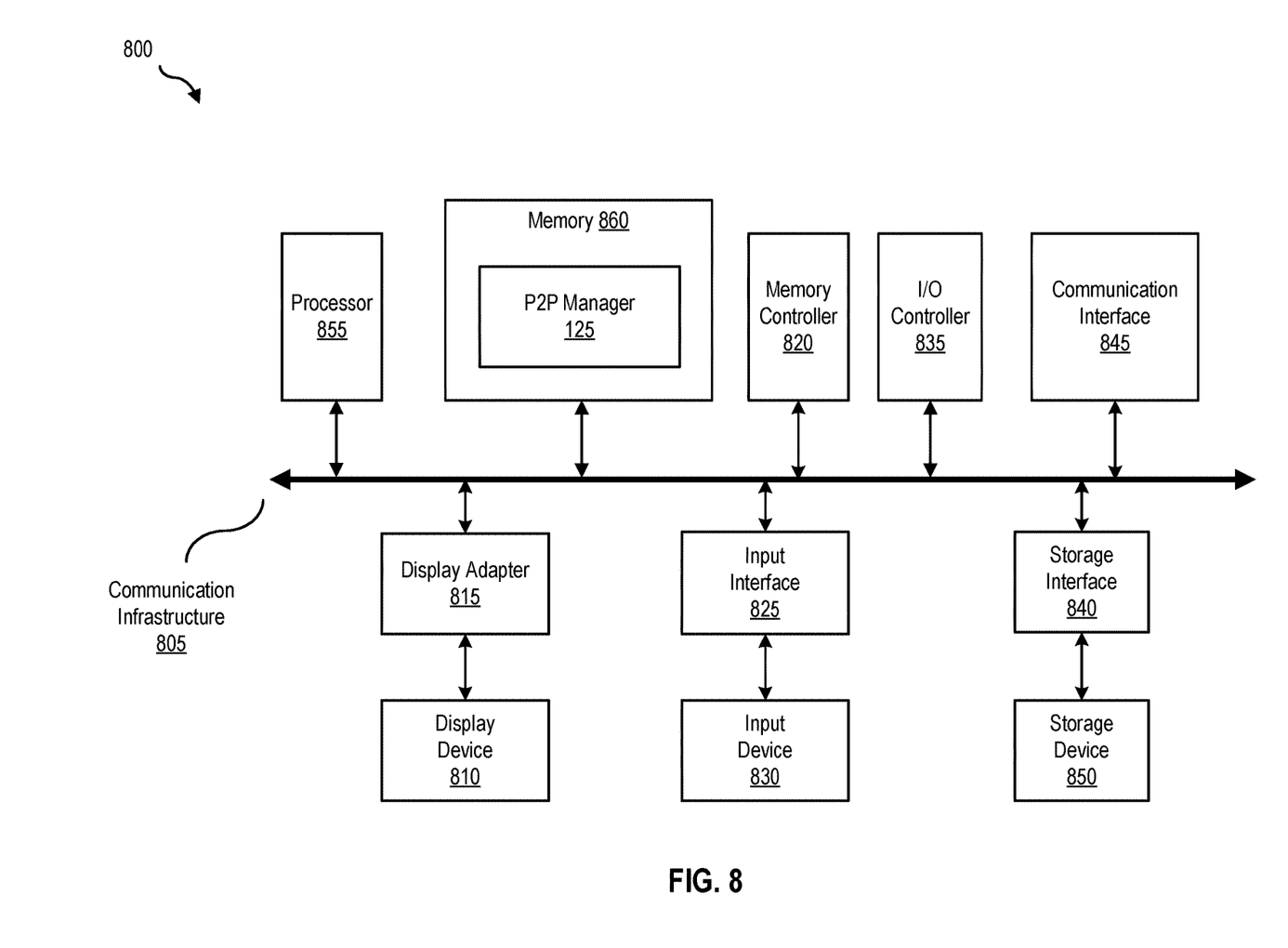
FIG. 8 is a block diagram 800 of a P2P support computing system, according to one embodiment of the present disclosure.

FIG. 8 is a block diagram 800 of a computing system, illustrating how P2P manager 125 can be implemented in software, according to one embodiment. Computing system 800 can include application server device 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes P2P manager 125, computing system 800 becomes a special purpose computing device that is configured to optimize peer to peer collaborative support.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing P2P manager 125 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850, old primary database server 110, new primary database server 120, old secondary database server 115, and/or new secondary database server 125. When executed by processor 855, a computer program loaded into computing system 800 may cause processor 855 to perform and/or be a means for performing the functions of one or more of the embodiments described/illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
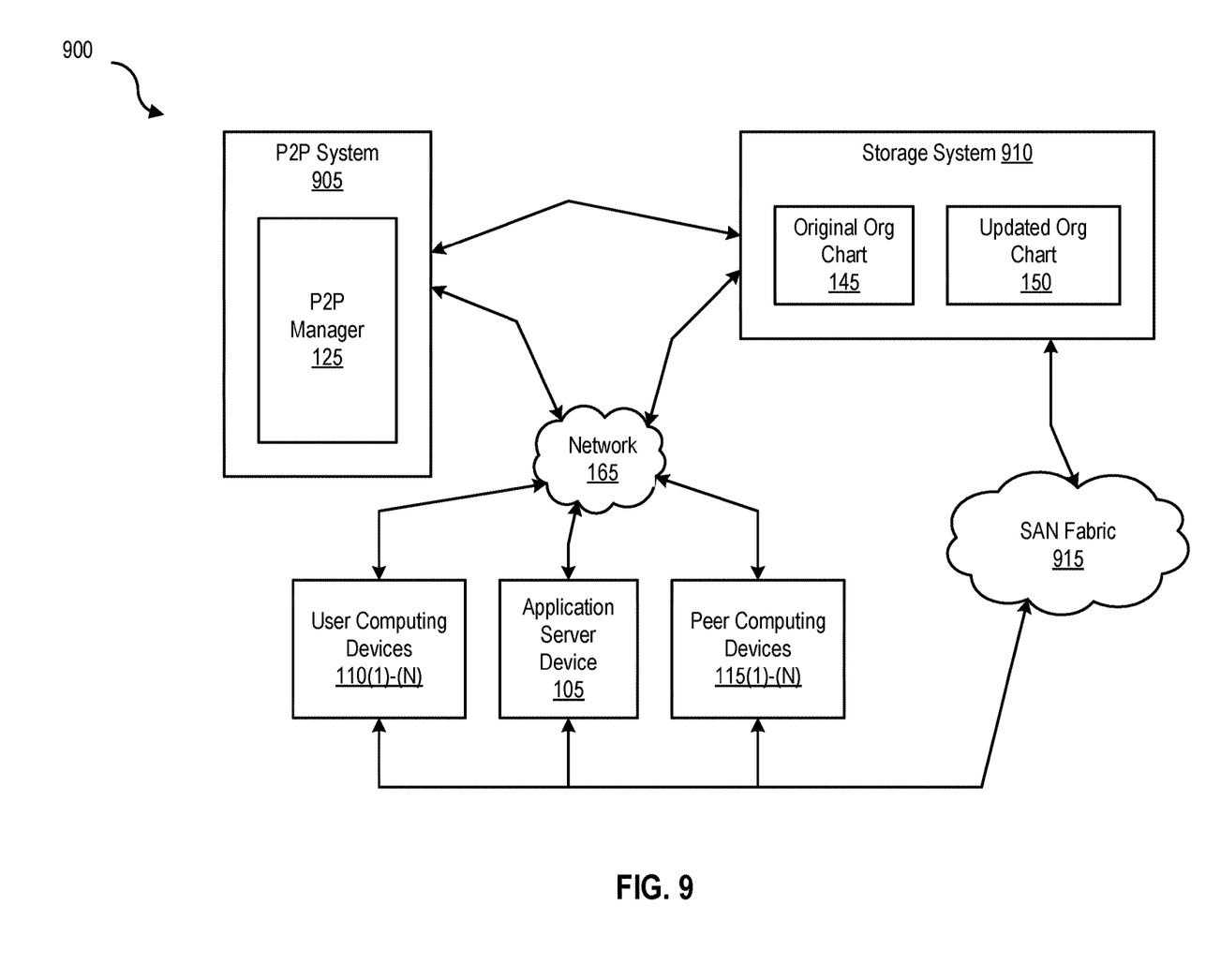
FIG. 9 is a block diagram 900 of a networked system, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with user computing devices 110(1)-(N), application server device 105, and/or peer computing devices 115(1)-(N) using Network File System (NFS), Server Message Block (SMB), or Common Internet File System (CIFS). Network 165 generally represents any type or form of computer network or architecture capable of facilitating communication between user computing devices 110(1)-(N), application server device 105, and/or peer computing devices 115(1)-(N).

In certain embodiments, a communication interface, such as communication interface 845 in FIG. 8, may be used to provide connectivity between P2P system 905 user computing devices 110(1)-(N), application server device 105, and/or peer computing devices 115(1)-(N), and network 165. The embodiments described and/or illustrated herein are not limited to the Internet or any particular network-based environment.

In some embodiments, network 165 can be a Storage Area Network (SAN). In other embodiments, P2P manager 125 may be part of application server device 105, or may be separate. If separate, P2P system 906, user computing devices 110(1)-(N), application server device 105, and/or peer computing devices 115(1)-(N) may be communicatively coupled via network 165.

In one embodiment, all or a portion of one or more of the disclosed embodiments may be encoded as a computer program and loaded onto and executed by application server device 105 and/or P2P system 905, or any combination thereof. All or a portion of one or more of the embodiments disclosed herein may also be encoded as a computer program, stored on application server device 105, storage system 910, and/or P2P system 905, and distributed over network 165.

In some examples, all or a portion of P2P system 905, user computing devices 110(1)-(N), application server device 105, and/or peer computing devices 115(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, P2P manager 125 may transform the behavior of application server device 105, and/or P2P system 905 in order to cause application server device 105, and/or P2P system 905 to optimize peer to peer collaborative support.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:

receiving a search request from a user computing device, wherein the search request comprises a query relating to a service request;

determining whether the search request requires support from service personnel within an organization;

if the search request requires support from service personnel within the organization, selecting a service personnel for responding to the search request;

if the search request does not require support from service personnel within the organization:

analyzing an organizational chart that details an internal structure of the organization based on the query, wherein the organizational chart comprises a plurality of knowledge profiles associated with a plurality of peers and a plurality of peer computing devices associated with the plurality of peers;

the knowledge profiles include information relating to expertise of peers of the plurality of peers to handle one or more types of service requests, and the knowledge profiles are generated based on extending a schema based on the organizational chart to add a definition of attributes and classes that are identified as part of the organizational chart, and the plurality of peers includes members of the organization who are service personnel and members of the organization who are non-service personnel;

generating, based on the analysis of the organizational chart, an expert map, wherein the expert map comprises a subset of the plurality of knowledge profiles, wherein each profile of the set includes information relating to expertise of peers of a subset of the plurality of peers to answer the service request;

using the expert map, generating a peer list comprising one or more peers of the plurality of peers, wherein the peer list is generated using a best-first search methodology, and the peer list includes peers having knowledge profiles indicating that the peers of the peer list have expertise in answering the service request;

sending the peer list to the user computing device;

selecting, at the user computing device, at least one peer from the peer list for responding to the service request;

monitoring interaction between the user of the user computing device and a peer computing device operated by the selected peer; and updating the organizational chart, wherein the updating includes updating one or more knowledge profiles of the plurality of knowledge profiles and one or more peer references of the plurality of peer references associated with at least one peer computing device of the one or more peer computing devices based, at least in part, on interactions between the selected peer and the user of the user computing device.

2. The computer-implemented method of claim 1, wherein each knowledge profile of the plurality of knowledge profiles is based on at least one of matter knowledge, availability, geo-location, or engagement level of each of the plurality of peer computing devices.

3. The computer-implemented method of claim 1, further comprising:

comparing one or more peer ratings with one or more peer references associated with at least one of the one or more peer computing devices;

based on the comparing, determining a level of false positive machine-skewing for each of the one or more peer references; and as part of the updating, refreshing the each of the one or more peer references based on the level of false positive machine-skewing.

4. The computer-implemented method of claim 1, further comprising:

generating the plurality of knowledge profiles by performing a schema extension operation comprising the organizational chart.

5. The computer-implemented method of claim 1, further comprising:

receiving a second search request from a second user computing device, wherein the second search request comprises a query relating to a second service request;

determining that the second search request requires support from service personnel within the organization;

sending the second search request received from the second user computing device to a support computing device.

6. The computer-implemented method of claim 1, further comprising:

receiving another search request from another user computing device, wherein the another search request comprises the query; and in response to receiving the another search request, generating another peer list from the updated organizational chart.

7. The computer-implemented method of claim 1, wherein the query is associated with one or more operating characteristics of an application, and the application is executed by the user computing device and each of the plurality of peer computing devices.

8. A non-transitory computer readable storage medium comprising program instructions executable to:

receive a search request from a user computing device, wherein the search request comprises a query relating to a service request;

determine whether the search request requires support from service personnel within an organization;

if the search request requires support from service personnel within the organization, select a service personnel for responding to the search request;

if the search request does not require support from service personnel within the organization:

analyze an organizational chart that details an internal structure of the organization based on the query, wherein the organizational chart comprises a plurality of knowledge profiles associated with a plurality of peers and a plurality of peer computing devices associated with the plurality of peers;

the knowledge profiles include information relating to expertise of peers of the plurality of peers to handle one or more types of service requests, and the knowledge profiles are generated based on extending a schema based on the organizational chart to add a definition of attributes and classes that are identified as part of the organizational chart, and the plurality of peers includes members of the organization who are service personnel and members of the organization who are non-service personnel;

generate, based on the analysis of the organizational chart, an expert map, wherein the expert map comprises a subset of the plurality of knowledge profiles, wherein each profile of the set includes information relating to expertise of peers of a subset of the plurality of peers to answer the service request;

use the expert map, generating a peer list comprising one or more peers of the plurality of peers, wherein the peer list is generated using a best-first search methodology, and the peer list includes peers having knowledge profiles indicating that the peers of the peer list have expertise in answering the service request;

send the peer list to the user computing device;

select, at the user computing device, at least one peer from the peer list for responding to the service request;

monitor interaction between the user of the user computing device and the at least one peer operating a corresponding peer computing device; and update the organizational chart, wherein the updating includes updating one or more knowledge profiles of the plurality of knowledge profiles and one or more peer references of the plurality of peer references associated with at least one peer computing device of the one or more peer computing devices based, at least in part, on interactions between the selected peer and the user of the user computing device.

9. The non-transitory computer readable storage medium of claim 8, wherein each knowledge profile of the plurality of knowledge profiles is based on at least one of matter knowledge, availability, geo-location, or engagement level of each of the plurality of peer computing devices.

10. The non-transitory computer readable storage medium of claim 8, further comprising:
  comparing one or more peer ratings with one or more peer references associated with at least one of the one or more peer computing devices;
  based on the comparing, determining a level of false positive machine-skewing for each of the one or more peer references; and
  as part of the updating, refreshing the each of the one or more peer references based on the level of false positive machine-skewing.

11. The non-transitory computer readable storage medium of claim 8, further comprising:
  generating the plurality of knowledge profiles by performing a schema extension operation comprising the organizational chart.

12. The non-transitory computer readable storage medium of claim 8, further comprising:
  receiving a second search request from a second user computing device, wherein the second search request comprises a query relating to a second service request;
  determining that the second search request requires support from service personnel within the organization; and
  sending the second search request received from the second user computing device to a support computing device.

13. The non-transitory computer readable storage medium of claim 8, further comprising:
  receiving another search request from another user computing device, wherein
    the another search request comprises the query; and
  in response to receiving the another search request, generating another peer list from the updated organizational chart.

14. The non-transitory computer readable storage medium of claim 8, wherein
  the query is associated with one or more operating characteristics of an application, and
  the application is executed by the user computing device and each of the plurality of peer computing devices.

15. A system comprising:
  one or more processors; and
  a memory coupled to the one or more processors, wherein the memory stores program instructions executable by the one or more processors to:
  receive a search request from a user computing device, wherein the search request comprises a query relating to a service request;
  determine whether the search request requires support from service personnel within an organization;
  if the search request requires support from service personnel within the organization, select a service personnel for responding to the search request;
  if the search request does not require support from service personnel within the organization:
    analyze an organizational chart that details an internal structure of the organization based on the query, wherein
      the organizational chart comprises a plurality of knowledge profiles associated with a plurality of peers and a plurality of peer computing devices associated with the plurality of peers, the plurality of peers including members of the organization who are service personnel and members of the organization who are non-service personnel;
    generate, based on the analysis of the organizational chart, an expert map, wherein the expert map comprises a subset of the plurality of knowledge profiles, wherein each profile of the set includes information relating to expertise of peers of a subset of the plurality of peers to answer the service request;
    using the expert map, generate a peer list comprising one or more peers of the plurality of peers, wherein
      the peer list is generated using a best-first search methodology,
      the peer list includes peers having knowledge profiles indicating that the peers of the peer list have expertise in answering the service request, and
      the knowledge profiles are generated based on extending a schema based on the organizational chart to add a definition of attributes and classes that are identified as part of the organizational chart;
  send the peer list to the user computing device;
  select, at the user computing device, at least one peer from the peer list for responding to the service request;
  monitor interaction between the user of the user computing device and a peer computing device operated by the selected peer; and
  update the organizational chart by at least updating one or more knowledge profiles of the plurality of knowledge profiles and one or more peer references of the plurality of peer references associated with at least one peer computing device of the one or more peer computing devices based, at least in part, on interactions between the selected peer and the user of the user computing device.

16. The system of claim 15, wherein
  each knowledge profile of the plurality of knowledge profiles is based on at least one of matter knowledge, availability, geo-location, or engagement level of each of the plurality of peer computing devices.

17. The system of claim 15, further comprising:
  comparing the one or more peer ratings with the one or more peer references associated with at least one of the one or more peer computing devices;
  based on the comparing, determining a level of false positive machine-skewing for each of the one or more peer references; and
  as part of the updating, refreshing the each of the one or more peer references based on the level of false positive machine-skewing.

18. The system of claim 15, further comprising:
  generating the plurality of knowledge profiles by performing a schema extension operation comprising the organizational chart.

19. The system of claim 15, further comprising:
  receiving a second search request from a second user computing device, wherein the second search request comprises a query relating to a second service request;
  determining that the second search request requires support from service personnel within the organization; and
  sending the second search request received from the second user computing device to a support computing device.

20. The system of claim 15, further comprising:
  receiving another search request from another user computing device, wherein
    the another search request comprises the query; and in response to receiving the another search request, generating another peer list from the updated organizational chart.

\* \* \* \* \*